H. MITTENDORF.
Revolving Harrows.

No. 136,169. Patented Feb. 25, 1873.

WITNESSES:
Charles Meisner
J. W. Ferthel

INVENTOR:
Henry Mittendorf
per. Herthel & Co.
Attys.

UNITED STATES PATENT OFFICE.

HENRY MITTENDORF, OF STONY HILL, MISSOURI.

IMPROVEMENT IN REVOLVING HARROWS.

Specification forming part of Letters Patent No. 136,169, dated February 25, 1873.

*To all whom it may concern:*

Be it known that I, HENRY MITTENDORF, of Stony Hill, Gasconade county and State of Missouri, have invented a certain Improved Revolving Harrow, of which the following is a specification:

The object of this invention is the formation of an improved revolving harrow, for harrowing, breaking, and pulverizing the soil. The nature of this invention relates to the specific combination and relative arrangement of parts to operate in manner hereinafter more fully to appear.

Figure 1:
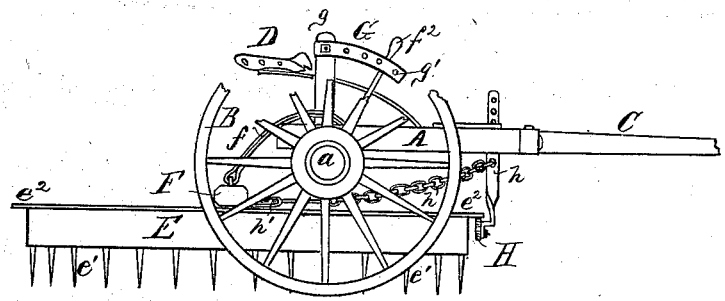
Figure 2:
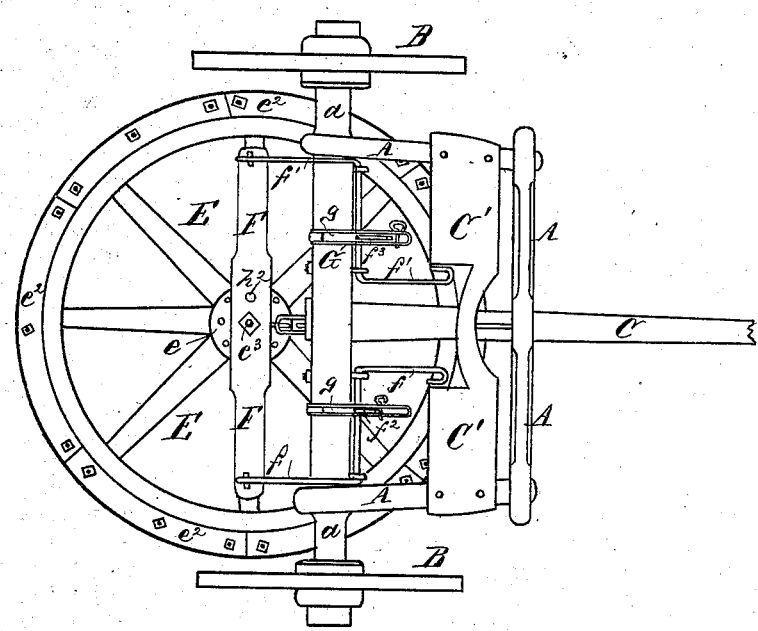
Figure 3:
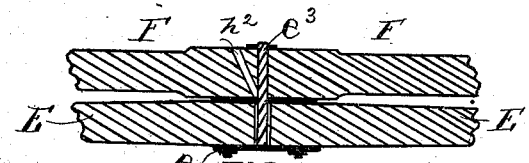

Figure 1 is a side elevation with parts broken away to show constructive features. Fig. 2 is a top plan. Fig. 3 is a detail section of connection of harrow to adjusting-bar.

The sulky attachment consists of frame A united to axle $a$, supported on wheels B. C is the tongue connecting with axle. $C'$ is a foot-board top of frame A. D is a seat secured by spring-bar to tongue. E is the harrow. The harrow is formed circular, like a wheel, its arms being firmly secured in a metallic hub, $e$, as indicated in Fig. 3. The revolving harrow at bottom is armed with an outer circular row of teeth, $e^1$, properly attached. The top of the harrow is provided with a projecting metallic rim, $e^2$, by means whereof the harrow is supported in front and guided in operation by a guide-wheel attachment hereinafter to appear.

The sulky is provided with following adjusting mechanism, by which the harrow can be raised above the ground or permitted to descend to its required operative position: The harrow E, by its hub $e$, connects with an axle-bolt, $e^3$, to an adjusting-bar, F. The bar F to be adjusted is therefore suspended by eyebolts to foot-levers $f\ f^1$. The foot-levers $f\ f^1$ are properly journaled to axle $a$, and bent in curved form, clearly shown in Figs. 1 and 2. Thus the bar F is suspended from rear ends somewhat lower than axle, while the forward part of foot-levers is bent properly to be operated by the foot of the operator. Further connected to form part of the foot-levers are hand-levers $f^2\ f^3$. The hand-levers engage a guide-standard, G, which is properly bolted near top of uprights $g$, which, in turn, are bolted to axle $a$. (See Figs. 1 and 2.) The standard G is provided with a series of holes, $g'$, in which a pin engages, securing the hand-levers, respectively, (as well as foot-levers,) in any adjusted position.

The arrangement of hand and foot levers is on both sides of seat within operative reach. The hand and foot lever power combined enables the operator, with greater ease and readiness, to adjust the adjusting mechanism, and consequently to control the harrow. One of the hand-levers being adjusted and secured more forward than the other lifts the harrow on corresponding side somewhat higher. The other side striking the soil causes said harrow to revolve.

To insure a more perfect operation and adjustment of the harrow, the same, by its projecting rim $e^2$, engages and is supported by a guide-wheel, H. The wheel H, by its standard $h$, passes through a slot in the tongue, and can be adjusted to any vertical position by a pin passing through the holes of said standard. (See Fig. 1.) The front part of harrow can thus be adjusted and secured so as not to strike the soil too deep or in an irregular manner, and also can be regulated to the sizes of draft animals or adjusted to depth of work to be performed.

To retain the guide-wheel H in operative position under the rim of harrow, its standard is connected by chain $h$ and swivel $h^1$, Figs. 1 and 2, to the axle-bolt $e^3$ of harrow. The swivel-joint, as shown, is intended to regulate and follow up requisite connection to retain the wheel H in operative engagement with harrow. $h^2$ is oil-cup providing, in adjusting-bar F, for lubricating purposes.

Having thus fully described my said invention, what I claim is—

The combination of a revolving harrow, E, rim $e^2$, swivel $h^1$, chain and standard $h$, guide-wheel H, adjusting-bar F, foot and hand levers $f\ f^1\ f^2\ f^3$, all said parts being constructed and arranged to operate as and for the purpose set forth.

In testimony of said invention I have hereunto set my hand.

HENRY MITTENDORF.

Witnesses:
 JOSEPH BRÄTLI,
 SIMON SMITH.